United States Patent [19]

Li

[11] Patent Number: 5,257,395
[45] Date of Patent: Oct. 26, 1993

[54] METHODS AND CIRCUIT FOR IMPLEMENTING AND ARBITRARY GRAPH ON A POLYMORPHIC MESH

[75] Inventor: Hungwen Li, Pleasantville, N.Y.

[73] Assignee: International Business Machines Corporation, Armonk, N.Y.

[21] Appl. No.: 890,281

[22] Filed: May 26, 1992

Related U.S. Application Data

[63] Continuation of Ser. No. 193,990, May 13, 1988, abandoned.

[51] Int. Cl.$^5$ ............................................. G06F 15/80
[52] U.S. Cl. ............................. 395/800; 364/228.1; 364/228.3; 364/229.4; 364/231.9; 364/253.1; 364/254.8; 364/259.8; 364/DIG. 1
[58] Field of Search .......... 364/DIG. 1, DIG. 2, 364/200, 900; 395/800; 382/47, 49

[56] References Cited

U.S. PATENT DOCUMENTS

| | | | |
|---|---|---|---|
| 3,320,594 | 5/1967 | Davies | 364/200 |
| 3,537,074 | 10/1970 | Stokes et al. | 364/200 |
| 3,675,215 | 7/1972 | Arnold et al. | 340/172.5 |
| 3,764,996 | 10/1973 | Ross | 340/172.5 |
| 3,840,863 | 10/1974 | Fuqua et al. | 340/172.5 |
| 3,958,222 | 5/1976 | Messina et al. | 364/200 |
| 3,970,993 | 7/1976 | Finnila | 364/200 |
| 4,101,960 | 7/1978 | Stokes et al. | 364/200 |
| 4,344,134 | 8/1982 | Barnes | 364/200 |
| 4,365,292 | 12/1982 | Barnes et al. | 364/200 |
| 4,412,303 | 10/1983 | Barnes et al. | 364/900 |
| 4,435,758 | 3/1984 | Lorie et al. | 364/200 |
| 4,498,134 | 2/1985 | Hansen et al. | 364/200 |
| 4,507,748 | 3/1985 | Cotton | 364/200 |
| 4,523,273 | 6/1985 | Adams et al. | 364/200 |
| 4,546,428 | 10/1985 | Morton | 364/200 |
| 4,574,348 | 3/1986 | Scallon | 364/200 |
| 4,580,215 | 4/1986 | Morton | 364/200 |
| 4,598,400 | 7/1986 | Hillis | 370/60 |
| 4,621,339 | 11/1986 | Wagner et al. | 364/900 |
| 4,739,474 | 4/1988 | Holsztynski | 364/200 |
| 4,783,738 | 11/1988 | Li et al. | 364/200 |
| 4,805,093 | 2/1989 | Ward | 364/200 |
| 4,809,346 | 2/1989 | Shu | 382/49 |
| 4,809,347 | 2/1989 | Nash et al. | 382/49 |
| 4,850,027 | 7/1989 | Kimmel | 382/49 |
| 4,870,568 | 9/1989 | Kahle et al. | 364/200 |
| 4,873,626 | 10/1989 | Gifford | 364/200 |
| 4,901,360 | 2/1990 | Shu et al. | 382/41 |
| 5,038,386 | 8/1991 | Li | 395/800 |
| 5,058,001 | 10/1991 | Li | 395/500 |
| 5,081,575 | 1/1992 | Hiller et al. | 395/325 |

OTHER PUBLICATIONS

A. Azizienis et al, "A Fault-Tolerant Parallel Computer System for Signal Processing", 4th FTCS, 1974.
Chen et al, IBM Technical Disclosure Bulletin, vol. 22, No. 6, p. 2491, Nov. 1979.

*Primary Examiner*—Thomas C. Lee
*Assistant Examiner*—Matthew C. Fagan
*Attorney, Agent, or Firm*—Philip J. Feig

[57] ABSTRACT

A single instruction multiple datastream (SIMD) polymorphic mesh network array processing system is modified by the inclusion of a single instruction multiple address (SIMA) circuit including a content addressable packet buffer memory to enable processing of an algorithm representing an arbitrary graph. Packets of address information and related data information associated with each independently addressable processing element forming the polymorphic mesh network array are transferred between the processing elements in accordance with one of a first-available method, a force transfer method, or a buffer sensitive method.

12 Claims, 20 Drawing Sheets

METHODS AND CIRCUIT FOR IMPLEMENTING AND ARBITRARY GRAPH ON A POLYMORPHIC MESH

This application is a continuation of application Ser. No. 07/193,990, filed May 13, 1988, now abandoned.

BACKGROUND OF THE IVNENTION

The present invention concerns the modification of a Single Instruction Multiple Datastream (SIMD) polymorphic mesh network array processing system by the inclusion of a Single Instruction Multiple Address (SIMA) mechanism including a content addressable packet buffer memory to enable processing by an algorithm representing an arbitrary graph rather than algorithms representing predetermined graphs.

In network design, a primary objective is to increase the speed of transmitting an instruction or performing a task while concurrently creating more network parallelism. In a preferred embodiment of the present invention, a fourth degree Single Instruction Multiple Datastream network array of conventional polymorphic mesh configuration is modified by a Single Instruction Multiple Address mechanism without altering the mesh network interconnection, in order to provide increased speed and network parallelism than in heretofore known arrangements.

In pending U.S. patent application Ser. No. 06/902,343 filed Aug. 29, 1986, now abandoned, in continuation application Ser. No. 07/208,850, filed Jun. 20, 1988, now U.S. Pat. No. 5,038,386, a polymorphic mesh network is described for a SIMD parallel architecture containing n x n processing elements interconnected physically by a mesh network within each processing element, wherein a polymorphic controller allows the architecture to dynamically derive many conventional graphs such as a tree, pyramid, cube and the like under instruction control. There is relatively low parallelism if the affected processing elements are not adjacent.

The SIMD generated graphs cover a wide spectrum of algorithms useful in image processing, computer vision and graphic applications. However, there are algorithms in these applications and others that are beyond conventional graphs and can only be represented by an arbitrary graph.

There is no general parallel architecture capable of matching all possible graphs since each algorithm results in a unique type of graph. The present invention describes several methods and a circuit which allow the processing elements in a polymorphic mesh architecture to establish communication between each other as prescribed by an arbitrary graph. The invention provides for buffer memory to address all processing elements having a matching address. This feature is the single instruction multiple address feature.

A SIMA circuit containing a two-dimensional memory, a priority circuit and a register, interacts with the polymorphic mesh network of processing elements through a data line. A controller provides address and mode signals. Polymorphic mesh processing requires each processing element to exchange with or deliver to its row or column neighbor information. The movement is guided by a packet which comprises an address and data. The SIMA circuit creates N addresses each of which points to the buffer memory that contains a packet having the proper bit value in the i-th position of the address. Packet exchanging or delivery is performed according to the transfer method employed.

Content-addressable-memory and two-dimensional memory are known to those skilled in the art. The use of a content-addressable memory to derive multiple addresses from a single instruction in a single instruction multiple datastream array processor is where the present invention resides, particularly as applied to packet exchange and delivery.

SUMMARY OF THE IVNENTION

A principal object of the present invention is therefore, the provision of a Single Instruction Multiple Address circuit which permits an arbitrary graph to be processed by a polymorphic mesh.

Another object of the invention is the provision of a Single Instruction Multiple Address circuit which accepts one address from the instruction and generates multiple output addresses to allow accessing to multiple packets located in different locations of a buffer memory, where the quantity of multiple addresses and packets is equal to the quantity of processing elements in a polymorphic mesh system.

A further object of the invention is the provision of a Single Instruction Multiple Address circuit which detects the existence of packets matching a prescribed pattern stored in arbitrary locations in a buffer addressable by a prescribed pattern issued in the instruction.

A still further object of the invention is the provision of a method of exchanging packets in a buffer memory on a first-available basis for allowing processing elements in a polymorphic mesh architecture to establish communication prescribed by an arbitrary graph.

A still further object of the invention is the provision of a method of exchanging packets in a buffer memory on a buffer-sensitive basis for allowing processing elements in a polymorphic mesh architecture to establish communication prescribed by an arbitrary graph.

A still other object of the invention is the provision of a method of exchanging packets in a buffer memory on a force-exchange basis for allowing processing elements in a polymorphic mesh architecture to establish communication prescribed by an arbitrary graph.

Further and still the objects of the invention will become more clearly apparent when the following description is taken in conjunction with the accompanying drawings.

DETAILED DESCRIPTION

Figure 1:
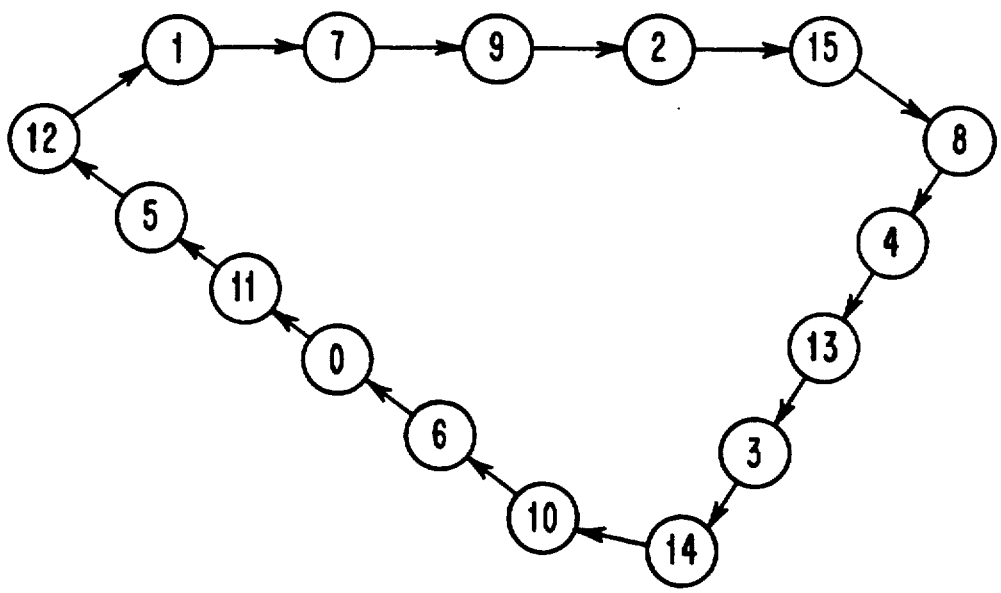
FIG. 1 is a schematic representation of an arbitrary graph of an algorithm.

Referring now to the figures and to FIG. 1 in particular, there is shown a schematic representation of an arbitrary graph of an algorithm. Any computer algorithm is capable of being represented by a graph with a node representing a task or process and the arrow representing the interconnecting communication when implemented in a parallel processor, the nodes are assigned to hardware processing elements (PE) and the arrows are implemented by communications paths among the processing elements.

Figure 2:
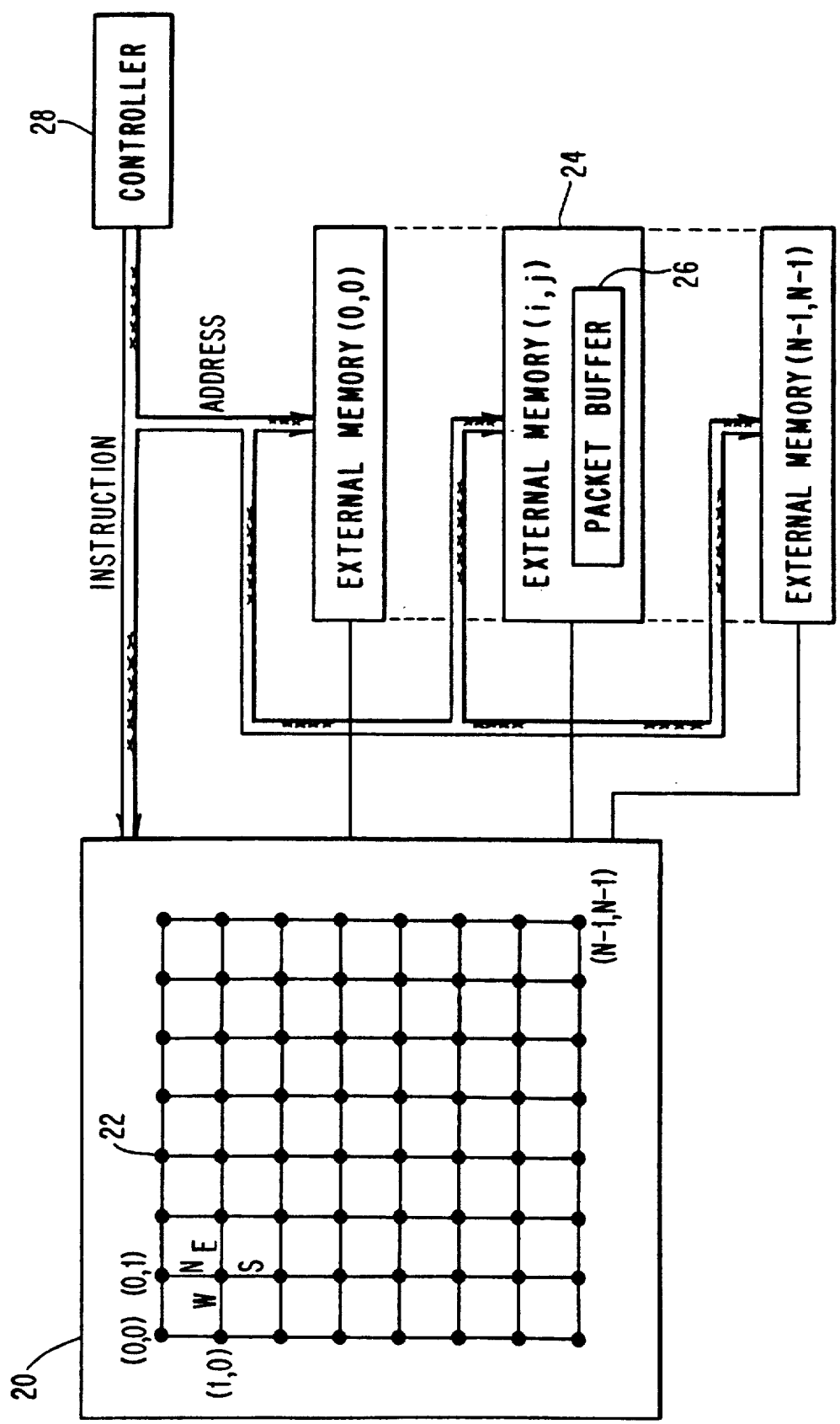
FIG. 2 is a schematic representation of a polymorphic mesh network of processing elements with a controller and external buffer memory.

FIG. 2 shows a polymorphic-mesh arrangement 20 of $N \times N$ processing elements 22. In the polymorphic-mesh arrangement, each processing element is situated in a specific row and column, represented by its coordinate, (r,c) where both r and c are in the range between 0 and n-1 and can be represented as two log(N) - bit strings: $r_k, r_{k-1} \ldots r, r_o$ and $c_k, c_{k-1} \ldots c, c_o$, where $k = \log(N)$.

A 0-row neighbor of processing element PE(s,t) is processing element PE(p,q) where s and p only differ in $s_o$ and $p_o$. Similarly, the 0-column neighbor of processing element PE(s,t) is processing element PE(p,q) if and only if t and q only differ in $t_o$ and $q_o$. Generalizing the definitions, the i-th row neighbor of processing element PE(s,t) is processing element PE(p,q) if and only if s and p differ only in $s_i$ and $p_i$. Similarly, the i-th column neighbor of processing element PE(s,t) is processing element PE(p,q) if and only if t and q differ only in $t_i$ and $q_i$.

According to the present invention, processing elements are required to exchange information with their i-row and i-column neighbors in a particular manner. In order to exchange information with 0-row and 0-column neighbors, the physical interconnections of the mesh arrangement are employed since the neighbors are located in adjacent rows or adjacent columns. In the case of 1-row (or 1-column) neighbors, the communication distance between neighbors is two rows (or columns). For example, the 1-row neighbor of 3=0011 is in row 1=0001. Therefore, shifting data twice along the row direction from processing element 3 at location (0,3) in the mesh toward the destination processing element 1 at location (0,1) in the mesh is required for the exchange. Such a shifting is referred to as "hop direction 2" to specify that data in every column (or row) are moving along the same direction for two columns (or rows). Similarly, the exchange between i-row or i-column neighbors requires a "hop direction $2^i$" where the "direction" can be north, east, south or west representing the four physical links of the processing elements 22 in the mesh arrangement 20.

Figure 3:
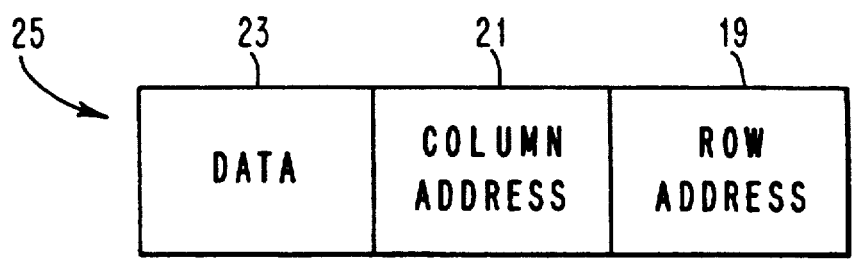
FIG. 3 is a representation of the format of a packet.

FIG. 3 illustrates the format of a packet of information. The i-row (or column) exchange is controlled by a packet 25 comprising the row address 19 of the packet, the column address 21 of the packet, and the data 23 to be exchanged. The packet 25 itself is stored in external memory 24 of the polymorphic system. The external memory is arranged for storing packets associated with each of the processing elements 22 in the mesh arrangement 20 in predetermined portions of the memory 24. The portion of the external memory 24 referred to as packet buffer 26 stores the packet of the associated processing element in content addressable locations. It is based upon the concept of content-addressable memory that a SIMA circuit described hereinafter alleviates the limitation of the SIMD architecture which is capable of providing only a single address to access the packets in the buffer and also permits N processing elements in the system to access their respective packets stored in N different locations of the packet buffer 26. It is the SIMA circuit which extends the capability of Single Instruction Multiple Datastream architecture and facilitates the realization of an arbitrary graph in the polymorphic mesh arrangement 20.

In conventional SIMD parallel architecture, the external memory 24 is addressed by an address signal from a controller 28 as shown in FIG. 2. As a result, the packets in the same buffer location will be selected for exchanging. The probability that packets in the same buffer memory location are i-th row or i-th column neighbors is fairly small. As a result, the conventional SIMD addressing scheme will exhibit very low parallelism in exchanging any of the packets.

In order to increase the parallelism, an addressing scheme is required which provides that for all buffer memories, any matching packet will be addressed simultaneously with a single instruction. The Single Instruction Multiple Address circuit shown in FIG. 4 performs the described function.

Figure 4:
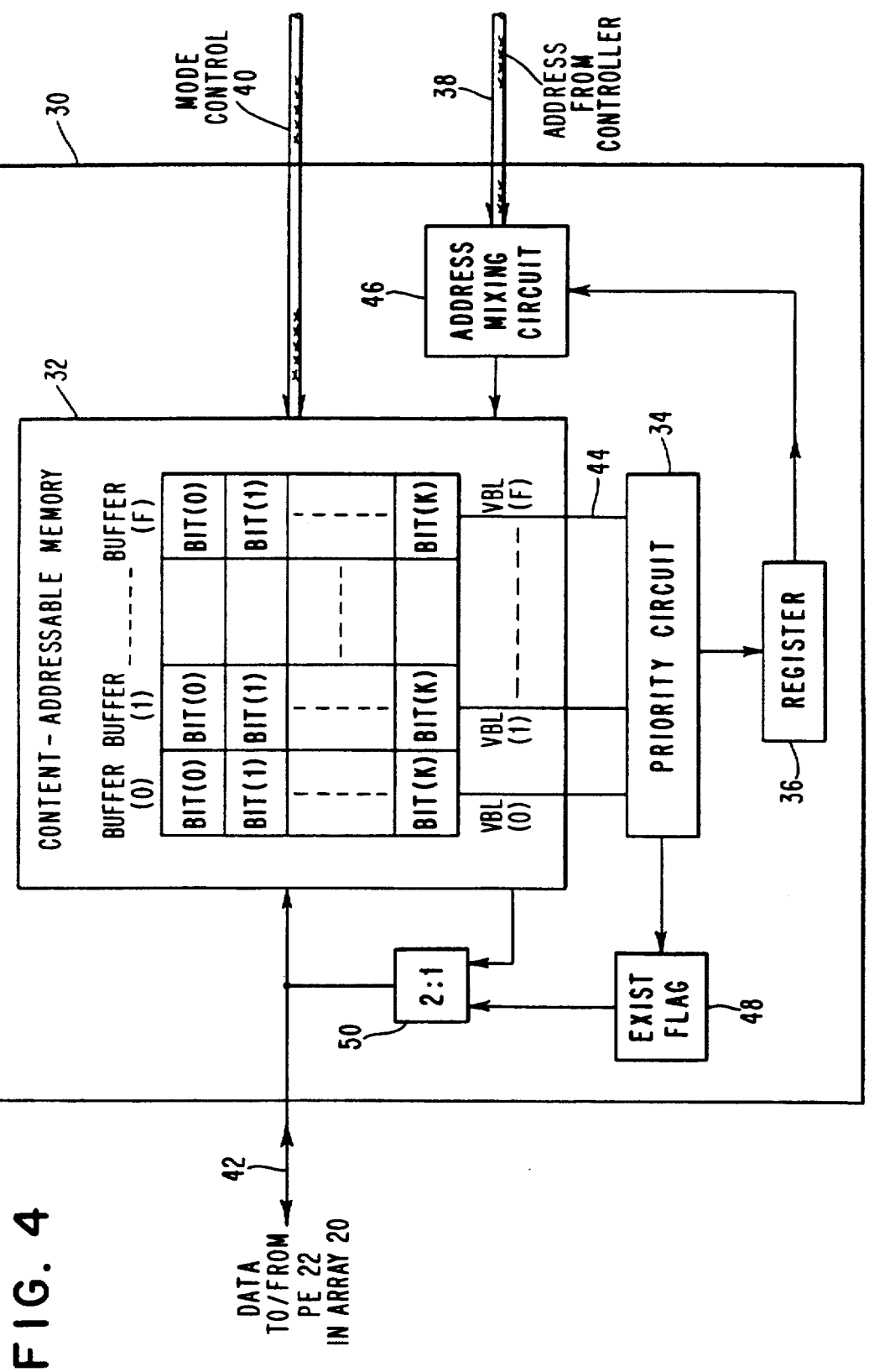
FIG. 4 is a schematic representation of a single instruction multiple address circuit containing a two-dimensional memory, a priority circuit and a register.

The SIMA circuit 30 shown in FIG. 4 includes a two dimensional, content-addressable memory 32, a priority circuit 34 and a register 36. The circuit 30 receives as input signals from controller 28, an address signal along conductor 38 and a mode control signal along conductor 40. The mode control signal provides for either conventional memory address mode in which one address results in one data output or preferably, provides for a content addressable mode in which given data results in multiple addresses. The circuit 30 communicates with each processing element 22 in array 20 via a data output signal along conductor 42. The function of the circuit 30 is to create N addresses each of which points to the buffer memory that contains a packet having a matching bit in the i-th position.

The two dimensional memory 32 is organized as F buffers horizontally and K bits vertically. In a conventional mode, the memory 32 is addressed horizontally so that the data bit can be read/write to/from the buffer memory 32. In a content addressable mode, the address is interpreted vertically such that a particular bit position, e.g. i-th position for i-th row packet detection, is selected. As a result, the i-th bit of all F buffers is compared with a logic "1" and when there is a match, the vertical bit line (VBL) 44 for the matching row will be reflected as a logic "1". There is one VBL for each buffer memory or a total of F VBL's connected to priority circuit 34.

The priority circuit 34 decodes the lowest index of the VBL that has a logic "1" signal present. The decoded lowest index corresponds to the address of the packet that has a matching bit position prescribed by the controller 28. The priority circuit is commercially available and has been used in general content-addressable memory as well as in the post normalization of floating point arithemetics. A preferred priority circuit is sold commercially by Fairchild Camera and Instrument Company as device number F100165.

The memory 32 and priority circuit 34 provide the capability of obtaining multiple addresses of matching packets under the control of a single instruction. These addresses are stored in the registers 36 distributed in each processing element. An address mixing circuit 46 permits the register 36 to be offset by the address provided by the controller 28 to properly access the buffer memory. The address mixing circuit 46 also controls the multiplexing between the register 36 and the address signal from the controller.

The priority circuit 34 in addition to providing the address of the matching circuit also resolves the conflict of having more than one matching packet in the same buffer. An output of the priority circuit 34 is coupled to an exist flag circuit 48 which indicates the existence of a matching packet in a buffer memory. The exist flag circuit output is provided to the appropriate processing element as an indication of whether a packet exists for exchanging. A multiplexer 50 switches the output between the exist flag circuit 48 and memory 32.

Content addressable memory is commercially available, for instance, from Fairchild Camera and Instrument Company as device number F100142. The present invention as will be described hereinafter resides in the deriving of a multiple address from a single instruction in content-addressable memory and applying the packet exchanging to SIMD architecture.

Having now described the SIMA circuit 30 which facilitates the exchange of data packets between processing elements, there are three alternative methods of achieving the exchange.

Referring to the arbitrary graph in FIG. 1, the following table illustrates the initial packet preparation of the 16 processing elements in the figure.

| SOURCE PE | | DESTINATION PE | | XOR <3:0> |
|---|---|---|---|---|
| PE = 0 | 0000 | PE = 11 | 1011 | 1011 |
| PE = 1 | 0001 | PE = 7 | 0111 | 0110 |
| PE = 2 | 0010 | PE = 15 | 1111 | 1101 |
| PE = 3 | 0011 | PE = 14 | 1110 | 1101 |
| PE = 4 | 0100 | PE = 13 | 1101 | 1001 |
| PE = 5 | 0101 | PE = 12 | 1100 | 1001 |
| PE = 6 | 0110 | PE = 0 | 0000 | 0110 |
| PE = 7 | 0111 | PE = 9 | 1001 | 1110 |
| PE = 8 | 1000 | PE = 4 | 0100 | 1100 |
| PE = 9 | 1001 | PE = 2 | 0010 | 1011 |
| PE = 10 | 1010 | PE = 6 | 0110 | 1100 |
| PE = 11 | 1011 | PE = 5 | 0101 | 1110 |
| PE = 12 | 1100 | PE = 1 | 0001 | 1101 |
| PE = 13 | 1101 | PE = 13 | 0011 | 1110 |
| PE = 14 | 1110 | PE = 10 | 1010 | 0100 |
| PE = 15 | 1111 | PE = 8 | 1000 | 0111 |

As can be seen from the table, processing element 0 packet is to be delivered to processing element 11, processing element 1 packet to be delivered to processing element 7, and so forth as shown in FIG. 1.

FIRST AVAILABLE METHOD

The first-availed method relies upon the ability of SIMA circuit 30 to obtain the first packet in the buffer memory that has a logic "1" bit in the i-th position of the packet, i.e. packet (i)=1, in the i-row exchange. For a j-column exchange, packet (j+k) is compared with a logic "1" so that the existence of a matching packet and its buffer address, if any, are provided.

The first available method is expressed in pseudocode as follows:

```
Phase 1:preparing packet
For each link of the graph, represent the source
node as
(sr_k sr_{k-1} ... sr_0, sc_k sc_{k-1} ... sc_0)
(sr for row of source node and sc for column of
source node) and represent destination node as
(dr_k dr_{k-1} ... dr_0, dc_k dc_{k-1} ... dc_0)
Obtain packet as
packet(i) = sr_i XOR dr_i
packet(i + k) = sc_i XOR dc_i
Attached w-bit data as packet(2k+1) to packet(2k+w)
Phase 2:Exchanging Packet
while (buffer__not__empty() ) {
   for (i=0;i<k;i++) {
      packet = first-available (i-th__row);
      packet = i-row__exchange ();
      packet(i) = 0;
   for (j=k; j<2k;j++) {
      packet = first-available (j-th__column);
      packet = j-col__exchange ();
      packet(j) = 0;
   }
}
```

The i-th row exchange function performs the exchange as follows. When packet(i)=1, the processing element sends the packet to its i-row neighbor which stores the received packet in the buffer memory and resets packet(i) to zero. If packet(i)=0, no packet is sent.

The exchange process continues until the buffer memory is empty. This is achieved by ORing every exist flag signal of all the SIMA circuits 30. Detailed tracking of the emptiness of the buffer is not shown for the sake of simplicity in expressing the exchanging algorithm.

Figure 5A:
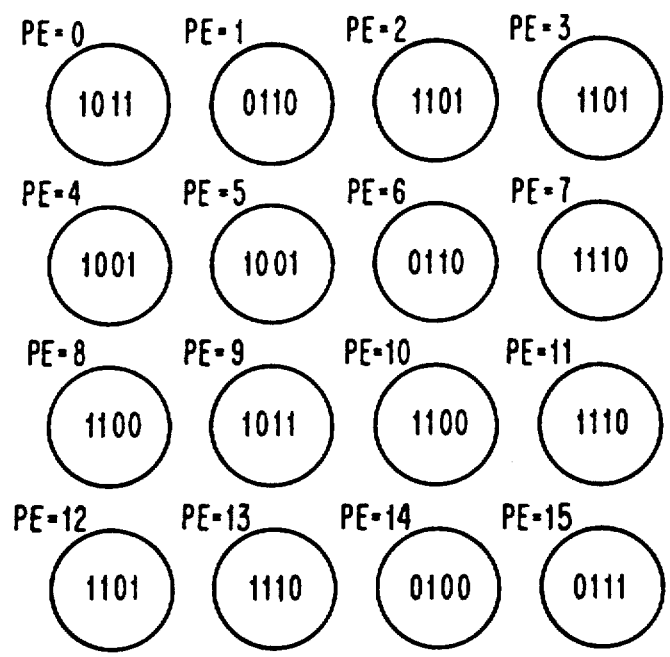
FIGS. 5A, 5B, 5C, 5D, 5E, 5F, 5G and 5H are schematic representations of the packet transfer between processing elements in accordance with a method of the present invention.

The exchange of the packets is shown schematically in FIGS. 5A-5H. In FIG. 5A there is shown an initial packet assignment for each processing element 0 to 15 in accordance with the table above. The processing elements are arranged in a polymorphic mesh configuration.

Figure 5B:
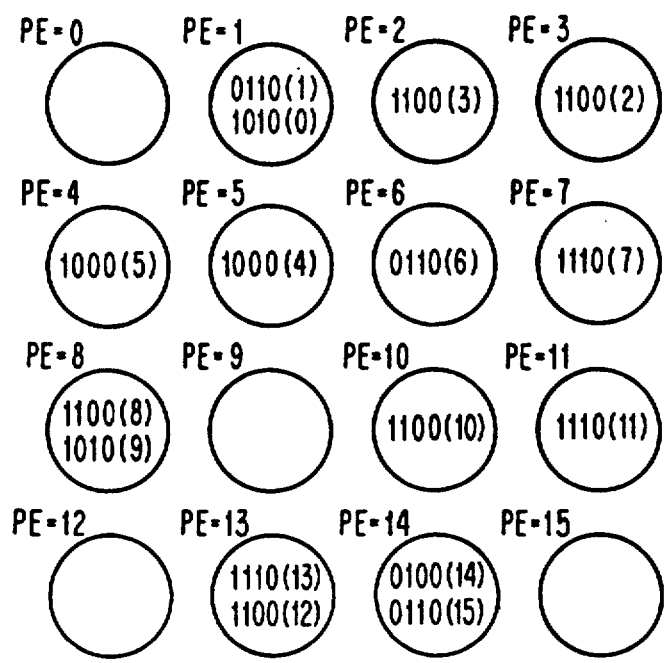

FIG. 5B illustrates the packets exchanged after a 0-row exchange during a first operating cycle according to the first-available method.

The number in parenthesis is the initial processing element location from which the packet originated. The same initial PE number will remain with the packet throughout all the subsequent exchanges. When two packets are shown in the same processing element, the uppermost data is the delivered packet and the lowermost data is the packet to be delivered. An empty processing element indicates the absence of any logic "1" in the address. A bar is added to the processing element when the packet above the bar has reached its final destination. The described convention will be used in all the ensuing figures.

Figure 5C:
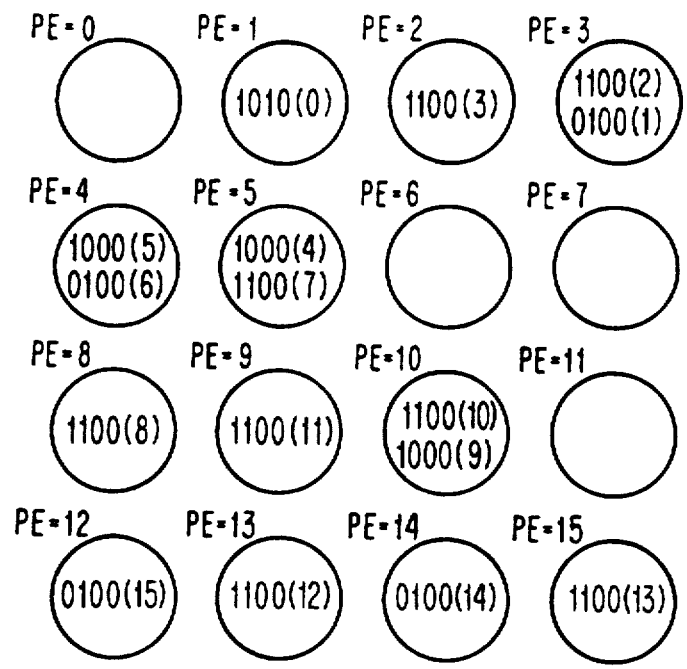
Figure 5D:
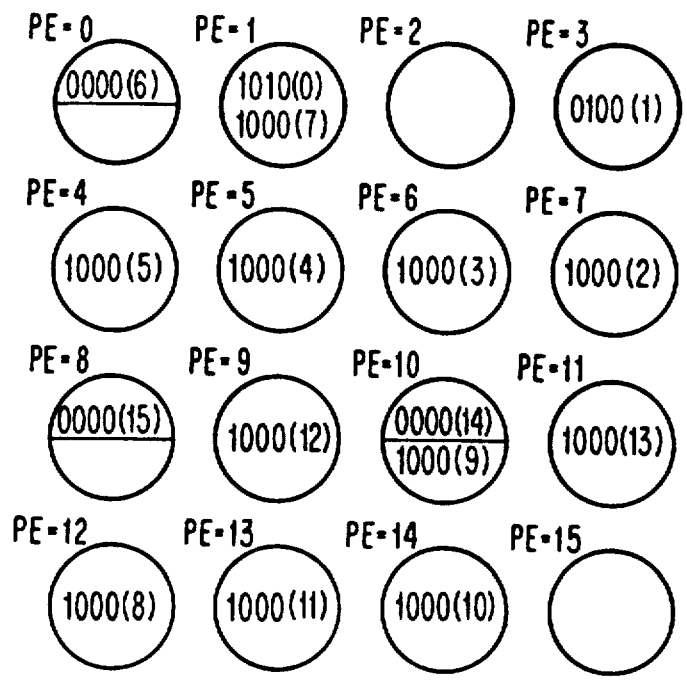

FIG. 5C illustrates the packets exchanged after a subsequent 1-row exchange cycle. FIG. 5D illustrates the packets exchanged after a subsequent 0-column exchange cycle. Subsequently a 1-column exchange cycle is performed and the results are shown in FIG. 5E.

Figure 5E:
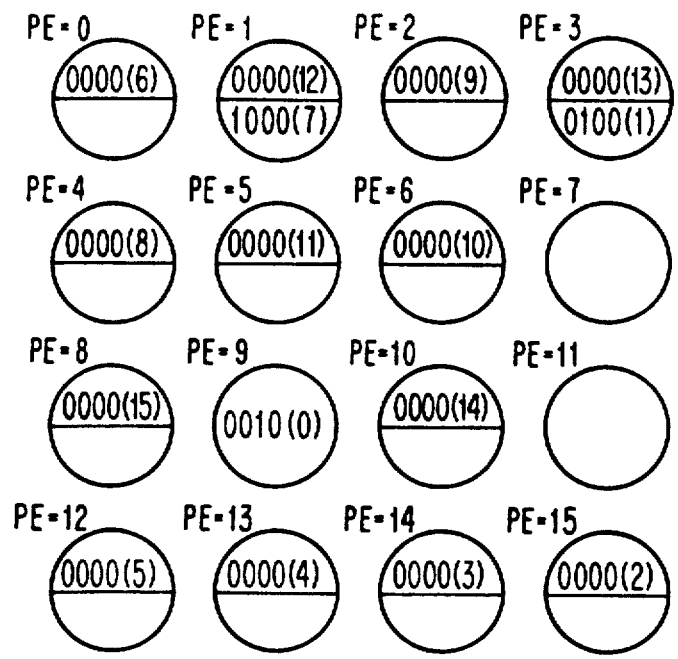
Figure 5F:
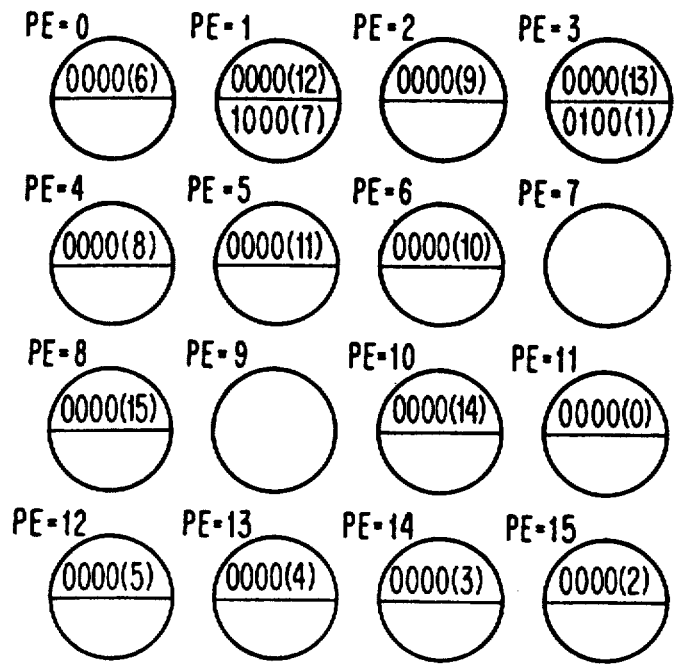
Figure 5G:
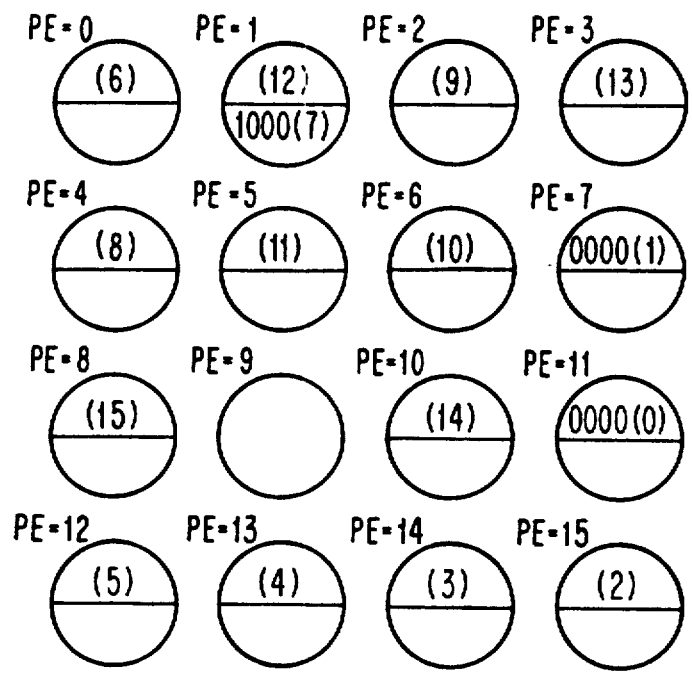
Figure 5H:
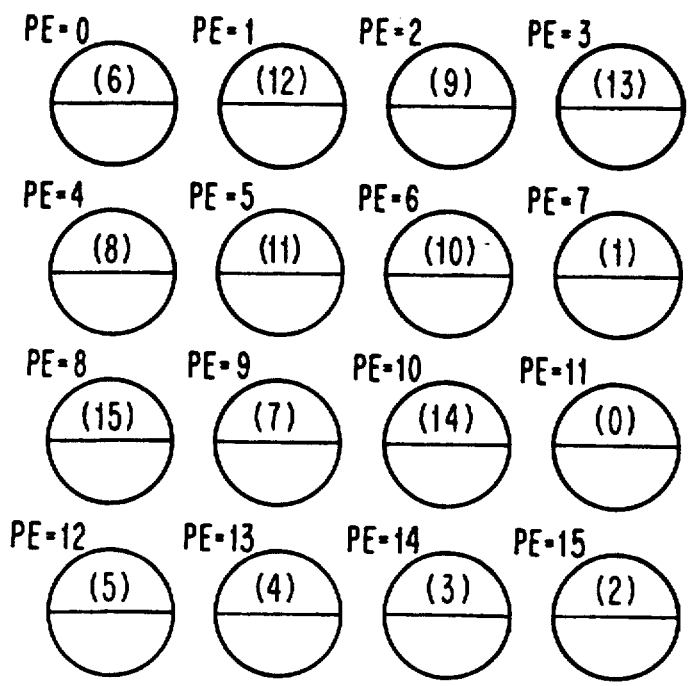

Since there are no packets for a 0-row exchange of the packets shown in FIG. 5E, a 1-row exchange is performed during a next cycle and the result is shown in FIG. 5F. A subsequent 0-column exchange is performed during the next operating cycle and the result is shown in FIG. 5G. Upon completion of another 1-column exchange cycle all the packets are delivered as shown in FIG. 5H.

The packets have been delivered in accordance with the arbitrary graph shown in FIG. 1. That is, the packet initially in PE=0 now resides in PE=11, the packet initially in PE=1 now resides in PE=7 and so forth.

The described first-available method requires that a packet is always forwarded to its i-row/column neighbor regardless of the ability of its neighbor to accept the packet due to, for example, a lack of buffer memory. A processing element will accumulate many packets in the just described method while the processing element is waiting in the buffer memory for delivery and additional packets are being delivered from neighboring processing elements. The phenomenon is referred to as "contention". One problem arising with contention is saturation or exhaustion of buffer memory.

An alternative method requires only a single buffer memory without contention and without saturation of memory.

BUFFER-SENSITIVE METHOD

The buffer-sensitive method prepares the packet in the same manner as the first available method. However, the packet exchange is different.

The buffer sensitive method is expressed in pseudo-code as follows:

```
Phase 1:Preparing packet
For each link of the graph, represent the source
node as
(sr_k sk_{k-1} ... sr_o sc_k sc_{k-1} ... sc_o)
(sr for row of source node and sc for column of
source node) and represent destination node as
(dr_k dr_{k-1} ... dr_o dc_k dc_{k-1} ... dc_o)
Obtain packet as
packet(i) = sr_i XOR dr_i
packet(i+K) = sc_i XOR dc_i
Attach w-bit data as packet(2k+1) to packet(2k+w)
Phase 2.Exchanging packet
while (buffer__not__empty ())
  for (i=0;i k;i++){
    temp__packet = i-row__exchange ();
    if ((temp__packet(i) AND packet(i) ) == 1)
       packet = temp__packet;
       packet (i) = 0;
    }
    else
       packet = old__packet;
  for (j=k;j<2k;j++){
    temp__packet = j-col__exchange();
    if ((temp__packet(j) AND packet (j)) = 1 ) {
       packet = temp__packet;
       packet(j) = 0;
    }
    else
       packet = old__packet;
  }
}
```

The method uses only one location of the packet buffer, i.e. temp__packet, in exchanging the packet and therefore buffer memory saturation cannot occur. However, because both packets must have a logic "1" in the matching position in order to exchange packets, situations will occur where a packet containing a level "1" will not be forwarded. This shortcoming is remedied in a further alternative method described hereinafter.

FIGS. 6A–6L illustrate the packet exchanges during each cycle using the buffer sensitive method.

Figure 6A:
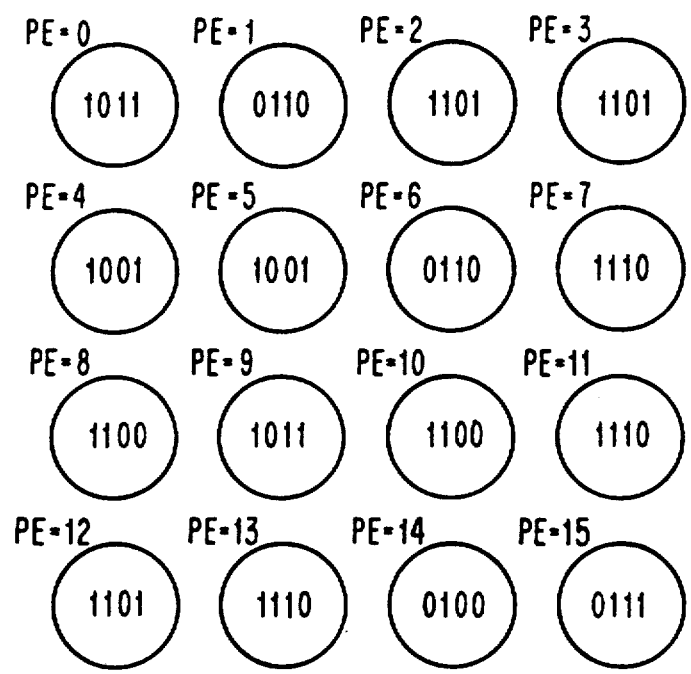
FIGS. 6A, 6B, 6C, 6D, 6E, 6F, 6G, 6H, 6I, 6J, 6K, 6L and 6M are schematic representations of the packet transfer between processing elements in accordance with another method of the present invention.
Figure 6B:
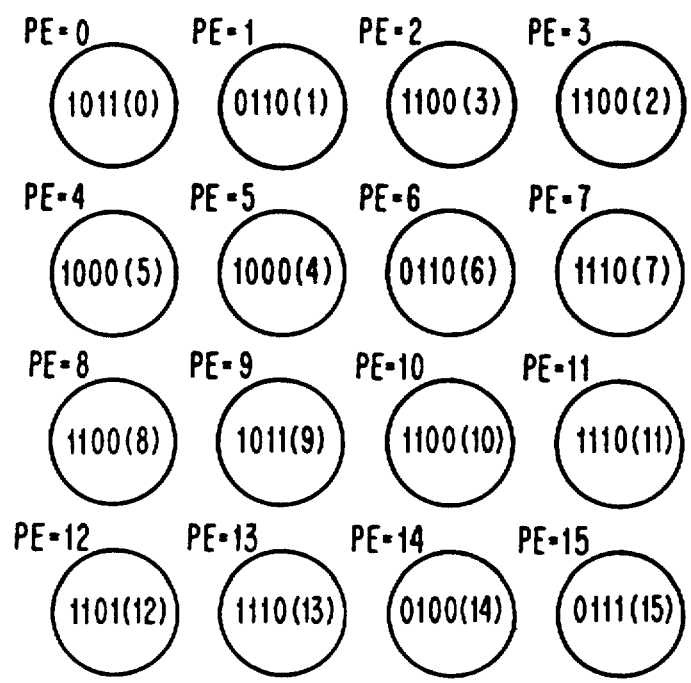

FIG. 6A illustrates the same initial packet assignment in each processing element as the first-available method. FIG. 6B illustrates the packet locations after completion of a 0-row exchange. The difference between the first-available method and the buffer sensitive method becomes apparent when, for example, it is observed that the packet from processing element 0 is not delivered to processing element 1 in the buffer sensitive method, while using the first-available method results in two packets being present in processing element 1. There are similar differences when comparing other processing elements in the mesh throughout the exchange procedure.

Figure 6C:
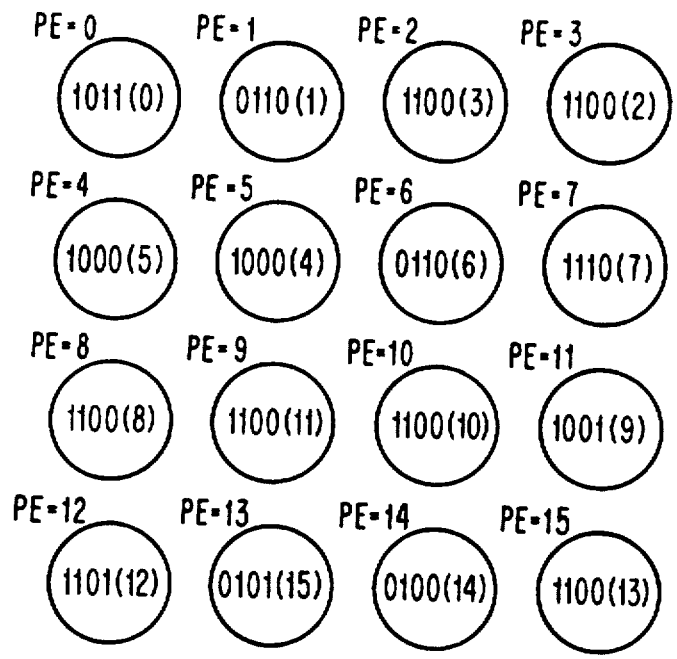
Figure 6D:
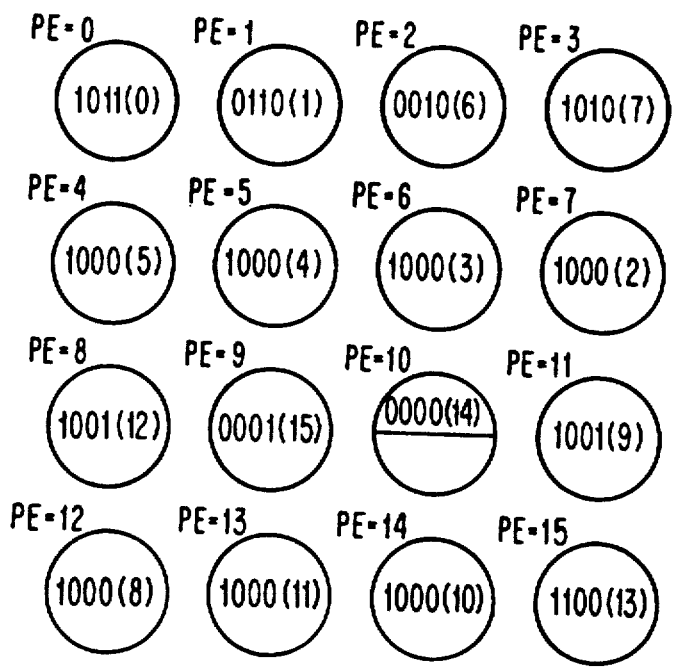
Figure 6E:
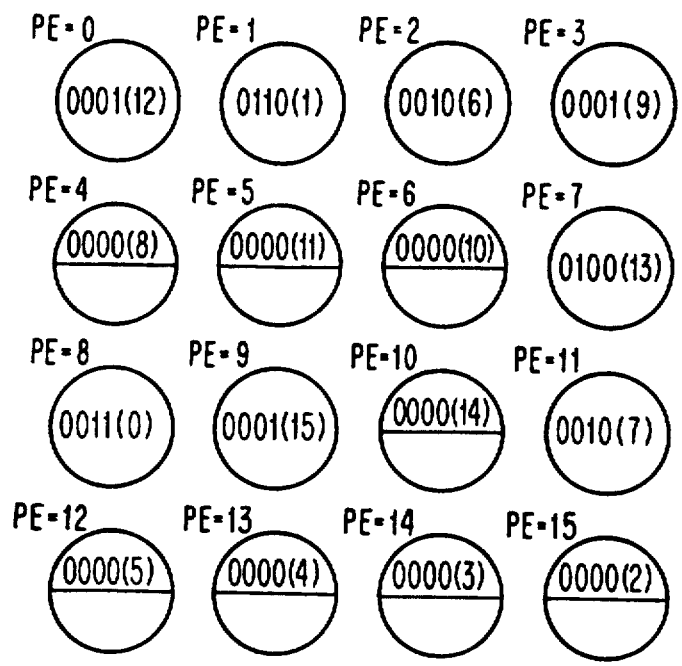

FIG. 6C illustrates the packet locations after a 1-row exchange. FIG. 6D illustrates the packet locations after a subsequent 0-column exchange. FIG. 6E illustrates the packet locations after a 1-column exchange.

When a processing element contains a packet which has reached its final destination, it is as if a logic "1" is in all the address bits for purposes of transferring a packet. Similarly, empty processing elements are treated as if a logic "1" is in all the address bits for purposes of transferring a packet.

Figure 6F:
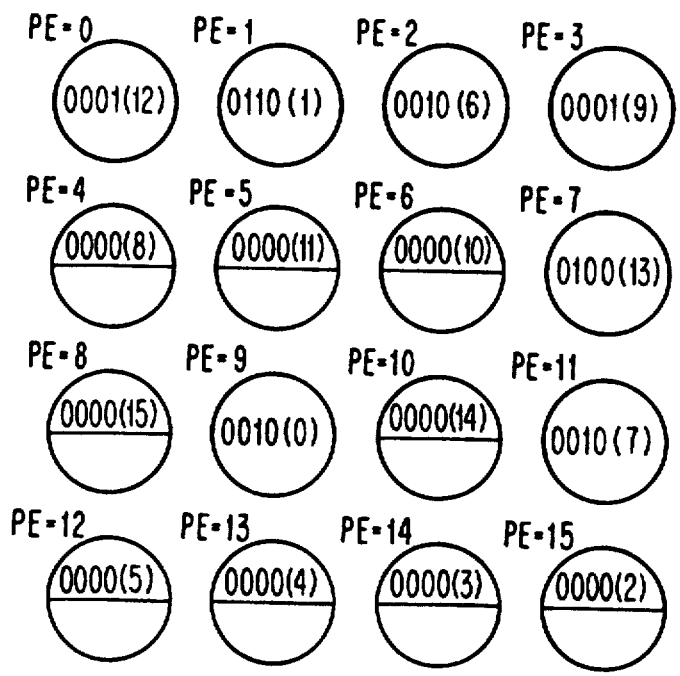
Figure 6G:
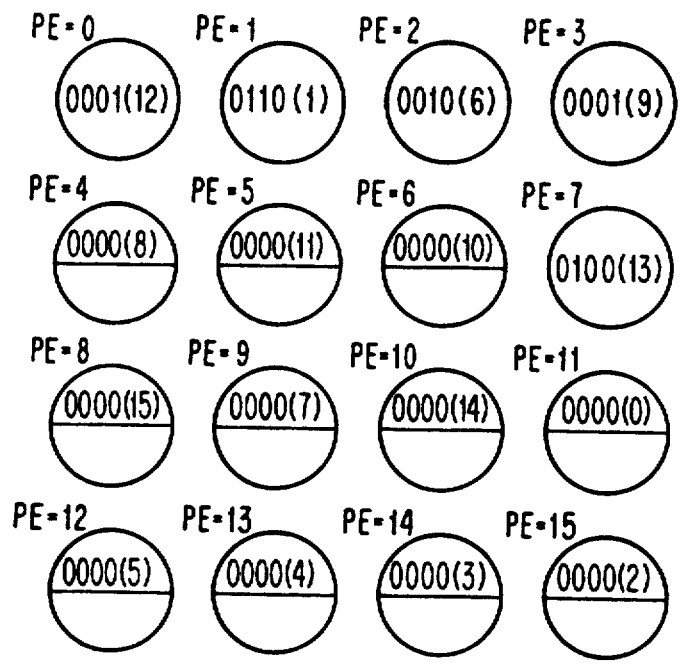
Figure 6H:
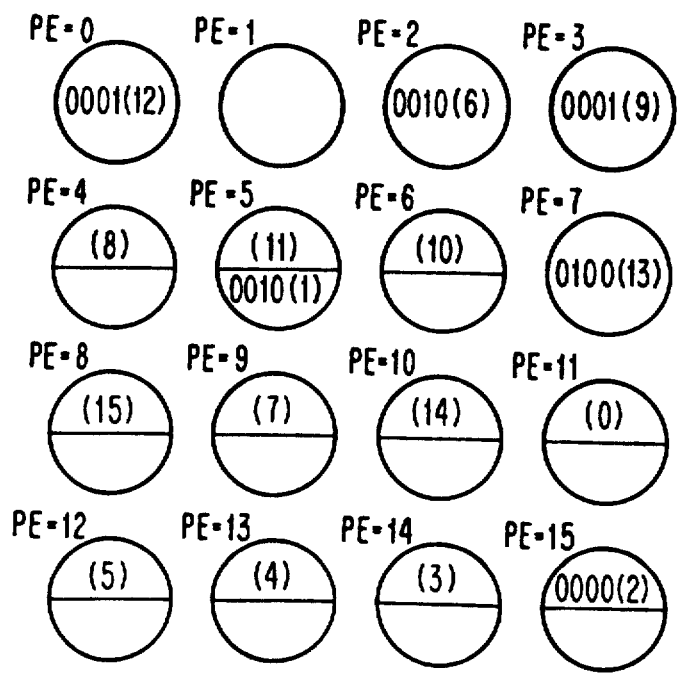
Figure 6I:
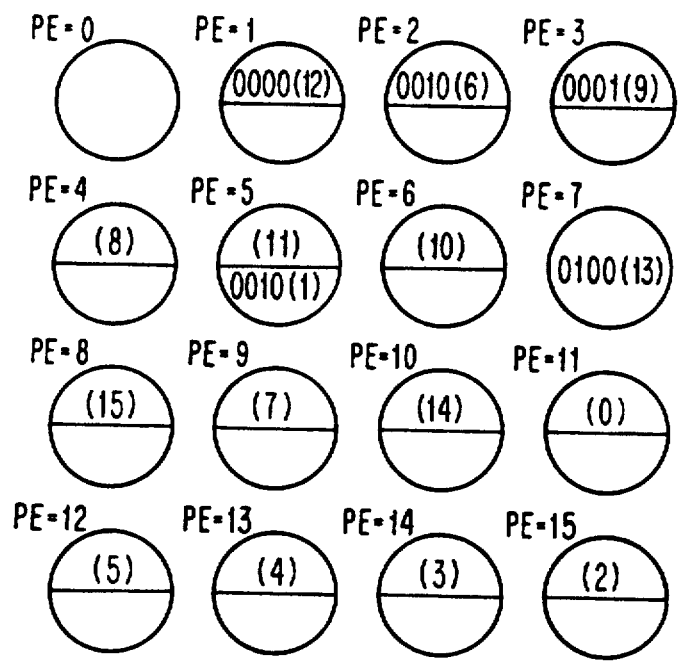
Figure 6J:
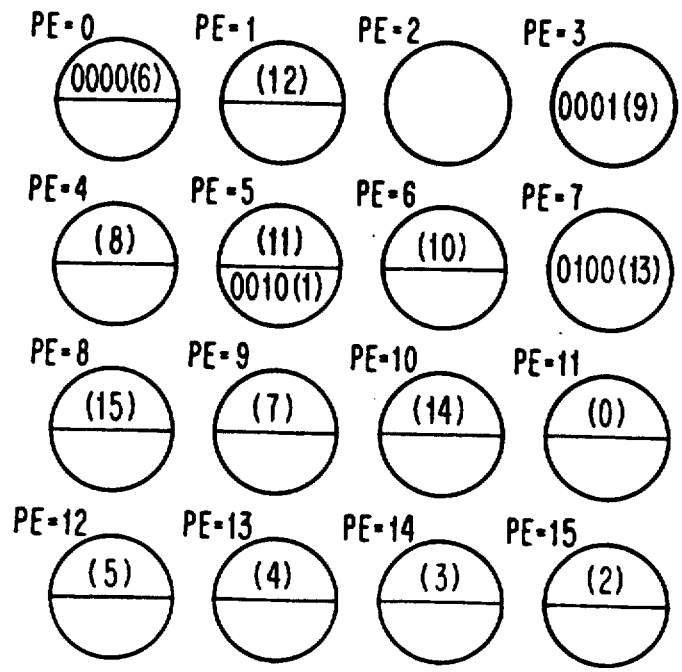
Figure 6K:
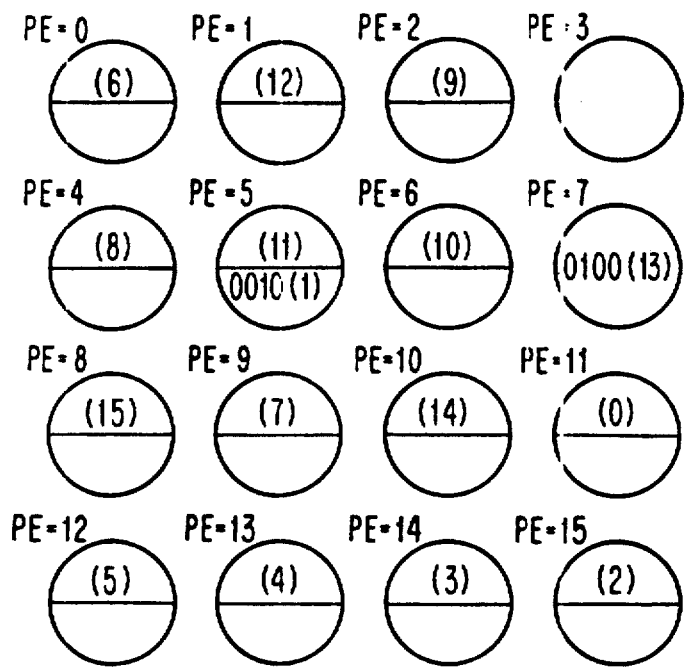
Figure 6L:
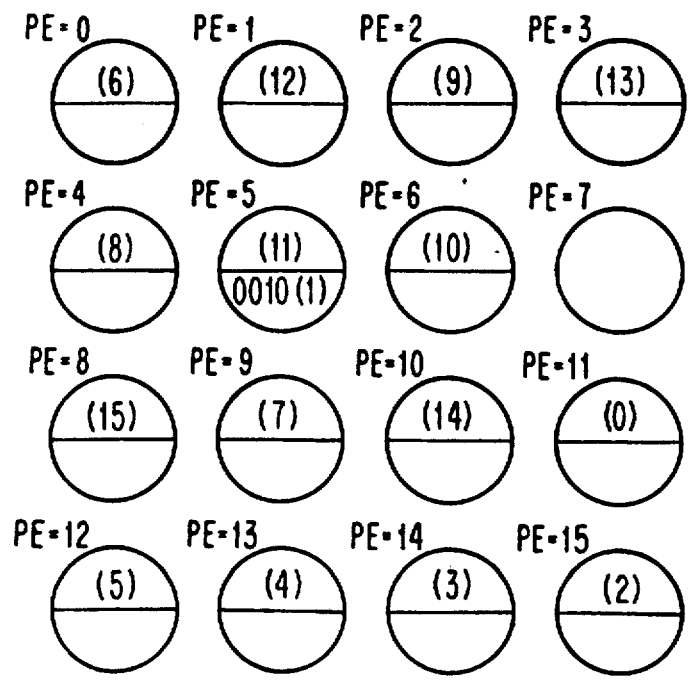
Figure 6M:
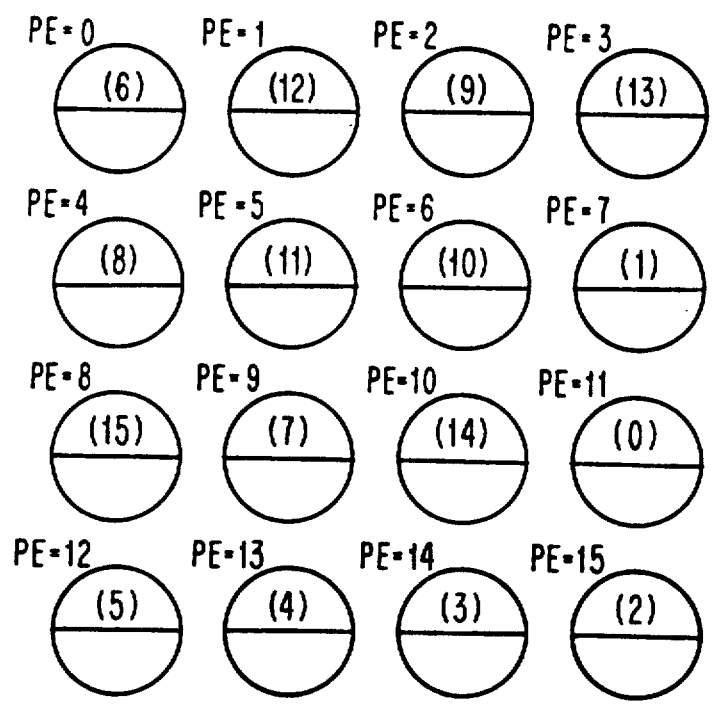

FIGS. 6F to 6H illustrate sequentially repeated 0-row exchange, 1-row exchange, 0-column exchange of packets. Since a subsequent 1-column exchange results in no packet movement, FIG. 6I illustrates the packet locations after a subsequent 0-row exchange. FIGS. 6J, 6K, 6L and 6M indicate packet locations after a sequence of a 1-row exchange, 0-row exchange, 0-column exchange and 1-row exchange after which all the packets are delivered at their respective final destinations in accordance with the arbitrary graph of FIG. 1. The omitted exchanges result in no packet movement.

Force Exchange Method

A further alternative method is referred to as the force-exchange method. In the force-exchange method, unlike the buffer-sensitive method in which packets are exchanged only when both neighbors agree to the exchange, i.e. when both neighbors have a logic "1" in the i-th bit, an exchange will be forced if only one neighbor wants to forward the packet, i.e. only one neighbor has logic "1" in the i-th bit.

The force-exchange algorithm is shown in pseudo-code as follows:

```
Phase 1.Preparing packet
For each link of the graph, represent the source
node as
(sr_k sr_{k-1} ... sr_o sc_k sc_{k-1} ... sc_o)
(sr for row of source node and sc for column of
source node) and represent destination node as
(dr_k dr_{k-1} ... dr_o dc_k dc_{k-1} ... dc_o)
Obtain packet as
packet(i) = sr_i XOR dr_i
packet(i+k) = sc_i XOR dc_i
Attached w-bit data as packet(2k+1) to packet(2k+w)
  Phase 2.Exchanging packet
  while (buffer__not__empty()) {
    for (i=0;i<2k;i++){
      temp__packet = i-row__exchange ();
      if ((temp__packet(i) OR packet(i)) = 1) {
        packet = temp__packet;
        packet(i) = INV (packet(i));
      }
      else
        packet = old__packet;
    }
    for (j=k; j<2k;j++) {
      temp__packet = j-col__exchange ();
      if ((temp__packet(j) OR packet(j) = 1)) {
        packet = temp__packet;
        packet (j) = INV (packet(j));
      }
      else
        packet = old__packet;
    }
  }
```

Similar to the buffer-sensitive method, the present method uses only one buffer location, temp__packet, for exchanging the packets thereby ensuring that there will be no saturation of buffer memory.

When only one neighbor is to exchange a packet, the force-exchange method forces the exchange to occur in order to facilitate the transfer for the one neighbor at the expense of the receiving neighbor. The receiving neighbor packet will be delivered to a processing element which is located further along in the mesh from its ultimate destination. The INV or inverse function reflects the described activity since inverting a logic "1" to a logic "0" indicates that the packet is closer to its ultimate destination, and conversely, inverting a logic "0" to a logic "1" indicates that the packet is further from its ultimate destination.

FIGS. 7A to 7L illustrate the packet exchange during each cycle when using the force-exchange method.

Figure 7A:
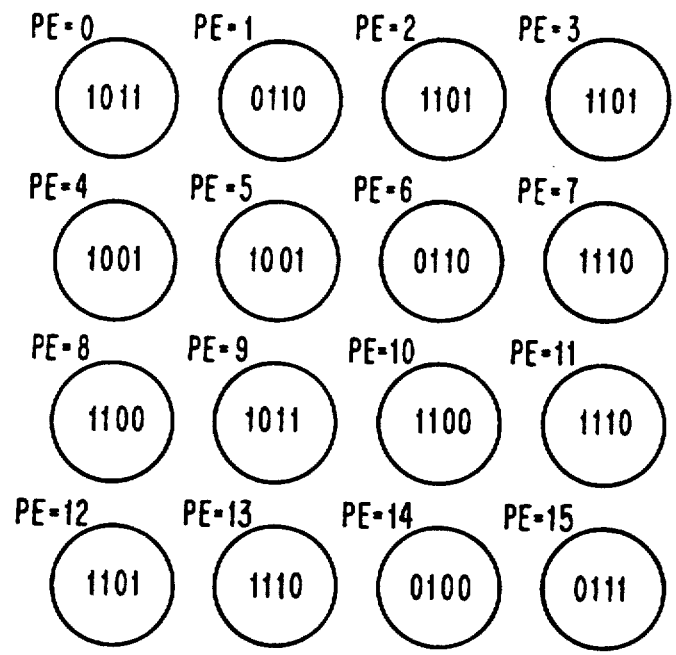
FIGS. 7A, 7B, 7C, 7D, 7E, 7F, 7G, 7H, 7I, 7J, 7K, and 7L are schematic representations of the packet transfer between processing elements in accordance with another method of the present invention.
Figure 7B:
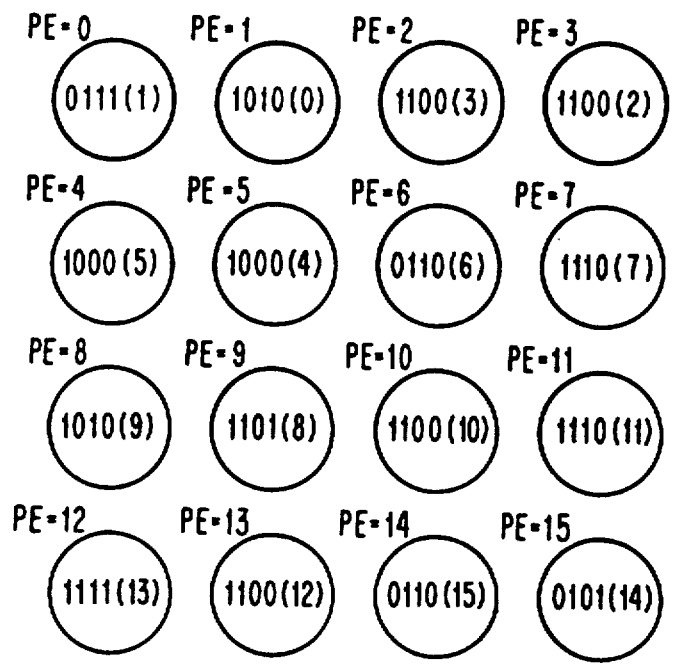

FIG. 7A illustrates the initial packet assignments in each processing element 0 to 15, which is the same as in FIGS. 5a and 6a. FIG. 7B illustrates the packet location after a 0-row exchange. It should be noted, for example, that packet exchange between processing elements 0 and 1 using the force-exchange differs from both of the prior described methods. In the present method, processing element 0 and processing element 1 exchange packets by virtue of a logic "1" in the least significant bit in the packet in processing element 0. In the buffer-sensitive method, no exchange occurs because the least significant bit of the packet in processing element 1 contains a logic "0" and both neighbors do not agree to exchange. In the first available method the packet from processing element 0 is delivered to processing element 1, and the packet in processing element 1 remains in processing element 1. The packet exchange differs for other processing elements in the mesh throughout the exchange procedure.

Figure 7C:
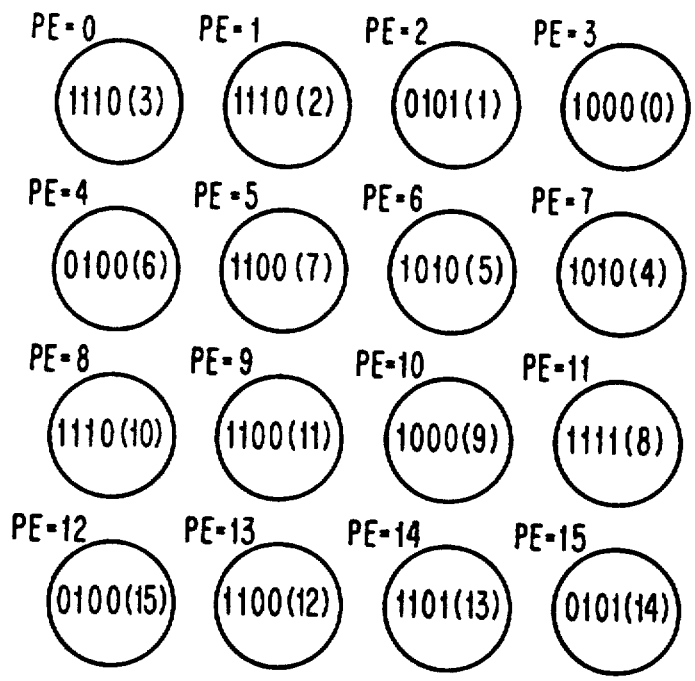
Figure 7D:
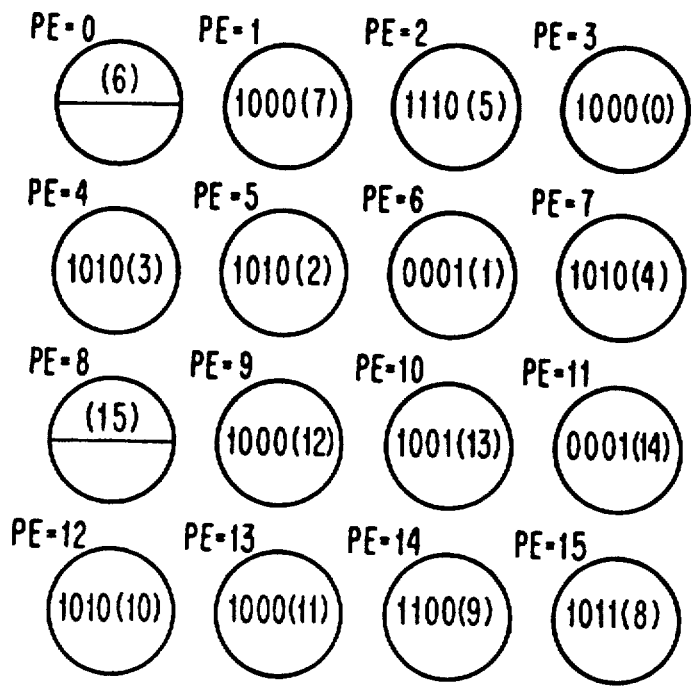
Figure 7E:
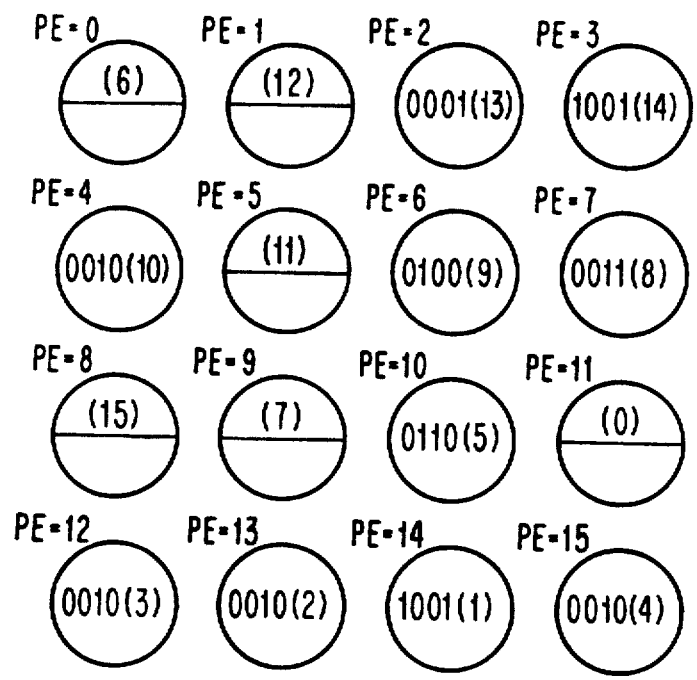
Figure 7F:
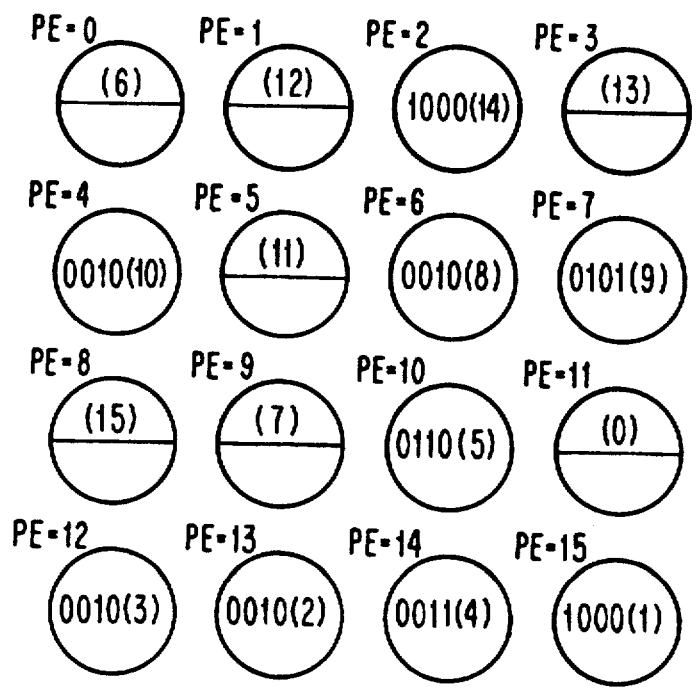
Figure 7G:
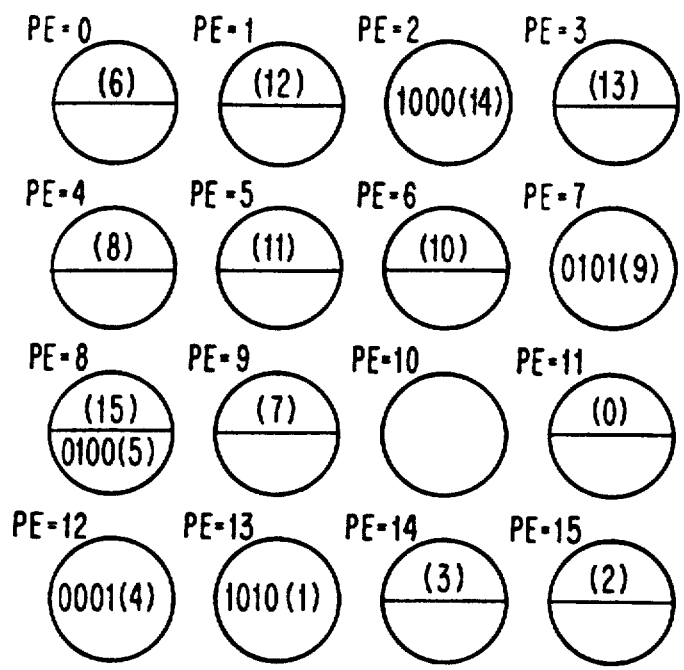
Figure 7H:
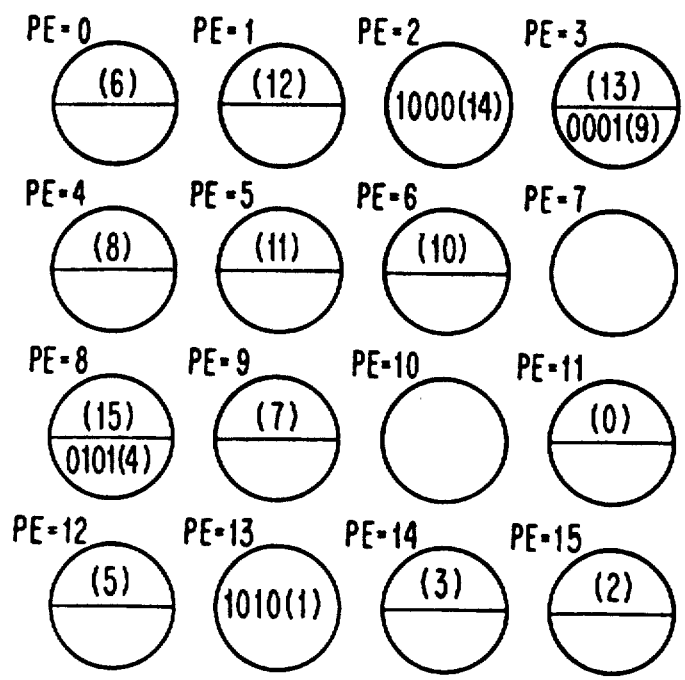
Figure 7I:
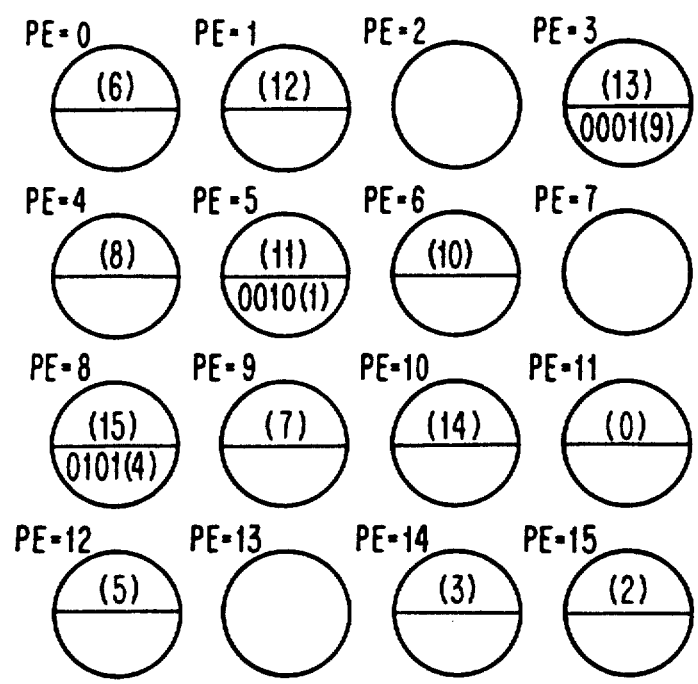

FIGS. 7C, 7D, 7E illustrate packet locations after undergoing a 1-row exchange, 0-column exchange and 1-column exchange in sequence. The sequential cycle of 0-row exchange, 1-row exchange, 0-column exchange and 1-column exchange is repeated and the results of the packet movements are shown in FIGS. 7F, 7G, 7H, 7I respectively.

Figure 7J:
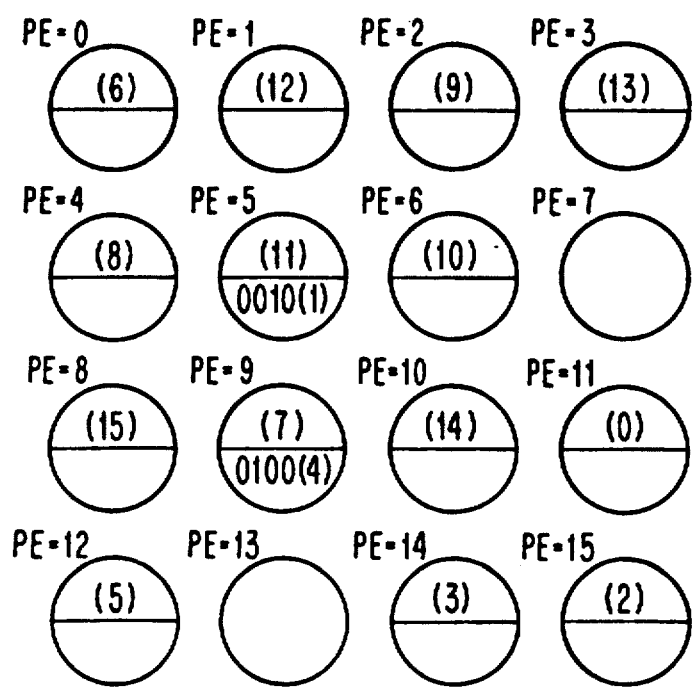
Figure 7K:
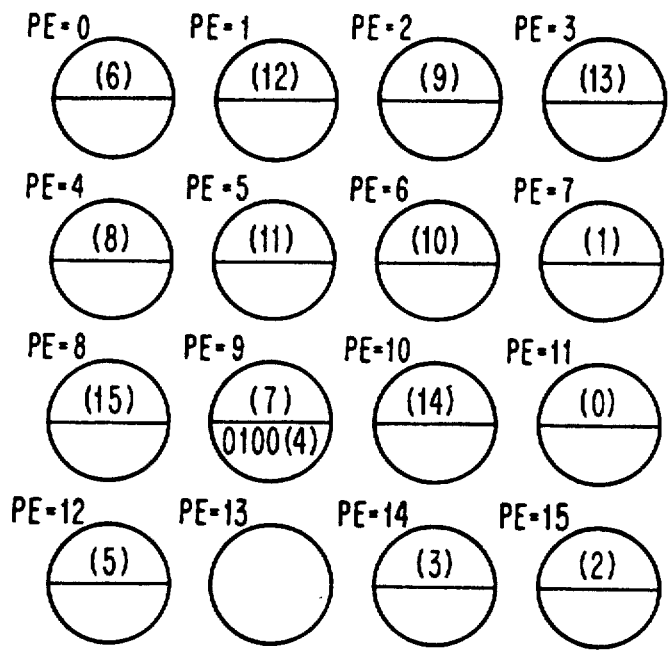
Figure 7L:
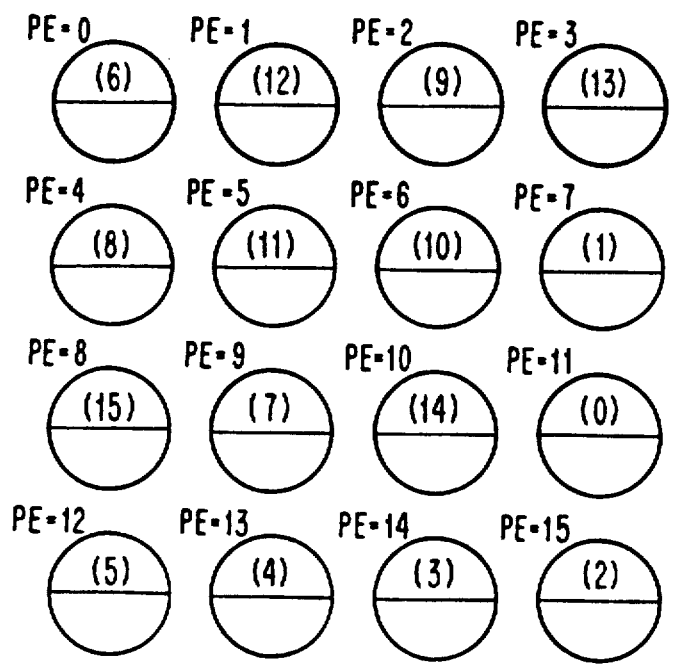

The sequence is repeated a third time and the results of the forced-exchange method are illustrated in FIGS. 7J, 7K, 7L where, after a third 0-column exchange, the packets have reached their respective final destinations in accordance with the arbitrary graph of FIG. 1.

In view of the foregoing description of the invention, the improvement over the state-of-the-art will be apparent to those skilled in the art. The single instruction multiple address circuit in combination with a single instruction multiple datastream polymorphic mesh arrangement enables realization of an arbitrary-degree graph using an architecture having a coplanar low-degree interconnection graph. That is, any algorithm can be implemented by the polymorphic-mesh architecture with a coplanar interconnection network having a degree of four.

The invention has a significant benefit for packaging of a large-scale parallel processor. The polymorphic mesh interconnections among the processing elements is compatible with conventional two-dimensional electronic packaging technology such as VLSI chip and printed circuit boards. The direct mapping between the architecture graph and packaging technology leads to a very efficient utilization of both chip and printed circuit board area. Moreover, the physical interconnection is conventional, expanding in four directions, which results in short wiring distances between locally adjacent processing elements thereby providing increased speed. Since neighboring processing elements that are logically related to one another are physically in close proximity to each other, the communication among the processing elements is much faster than other higher-degree graphs, such as a n-cube. The increased speed is further enhanced by the denser packaging. In summary, more packets, measured in terms of quantity of bits per second, can be communicated than in heretofore known systems.

The system size is expandable by expansion in four directions by means of additional interconnections within the system, thus modular packaging is obtainable.

Having described and illustrated a circuit for use in and several methods of processing an algorithm represented by an arbitrary graph by a polymorphic-mesh, it will be apparent to those skilled in the art that variations and modifications are possible without deviating from the broad scope of the invention which shall be limited solely by the scope of the claims appended hereto.

What is claimed is:

1. A polymorphic-mesh array processing system in which a packet of information containing address information and related data information is transferred during an operating cycle from one individually addressable processing element to another individually addressable processing element comprising:

a plurality of N individually addressable processing elements configured in a single instruction multiple datastream mode where N is an integer greater than one;

controller means for providing a signal containing an instruction and an address for said processing elements during sequential operating cycles for transferring a respective packet from a first one of said processing elements to a second one of said processing elements in response to said instruction and said address according to an arbitrary graph; and single instruction multiple address means, including content addressable packet buffer memory and connected to said controller means and to said processing elements, for causing during one of the sequential operating cycles said second processing element to access the respective packet in said buffer memory associated with said first processing element, in responses to the address from said controller means, whereby the system transfers the respective packet from said first processing element to said second processing element to implement the arbitrary graph.

2. The array processing system as set forth in claim 1, wherein said single instruction multiple address means causes during said one operating cycle the respective packet to be transferred from said first processing element to said second processing element when a preselected bit of the respective packet is in a predetermined condition.

3. The array processing system as set forth in claim 1, wherein said single instruction multiple address means causes during said sequential operating cycles a concurrent transfer of a first respective packet from one of said processing elements to another of said processing elements and of a second respective packet from said another processing element to said one processing element when a preselected bit of either said first respective packet or said second respective packet is in a predetermined condition.

4. The array processing system as set forth in claim 1, wherein said single instruction multiple address means causes during said sequential operating cycles a concurrent transfer of a first respective packet form one of said processing elements to another of said processing elements and of a second respective packet from said another processing element to said one processing element when a preselected bit of both said first and second respective packets are in a predetermined condition.

5. The array processing system as set forth in claim 1, wherein said single instruction multiple address means receives the address from said controller means and generates N output address signals for accessing by each processing element of N packets located in respective buffer memory locations of said content addressable packet buffer memory.

6. The array processing system as set forth in claim 1, wherein said single instruction multiple address means generates an exist signal to said first processing element when a preselected bit of the respective packet is in a predetermined condition and the respective packet is to be transferred from said first processing element.

7. The array processing system a set forth in claim 6, wherein exist signals from said single instruction multiple address means are prioritized.

8. A method for transferring information in a polymorphic-mesh array processing system during an operating cycle from one of a plurality of N individually addressable processing elements, where N is an integer greater than one, to a neighboring one of said processing elements comprising the steps of:

storing in a single instruction multiple address means a respective packet associated with each processing element;

determining whether a predetermined bit of each stored packet associated with each processing element is at a preselected condition; and transferring the stored packet associated with one of said processing elements to a neighboring one of said processing elements when the predetermined it of the stored packet associated with said one processing element is at the preselected condition according to a first available method, a force transfer method, or a buffer sensitive method.

9. The method as set forth in claim 8, wherein the transferring of the stored packet associated with said one processing element is prioritized when the predetermined bit is at the predetermined condition on more than one stored packet.

10. An array processing system in which a packet containing address information and related data information is transferred during an operating cycle from one processing element to another processing element comprising:

an array of individually addressable processing elements configured in single instruction multiple datastream mode wherein certain ones of said processing elements are directly connected to each other;

controller means for providing during sequential operating cycles an instruction with an address signal; and single instruction multiple address means, including a content addressable packet buffer memory and connected to said controller means and to said processing elements, for comparing a condition of a preselected bit in a respective packet in said content addressable packet buffer memory associated with each processing element with a predetermined condition and for providing to each processing element a respective packet in said content addressable packet buffer memory according to address information contained in the respective packet when the condition of the predetermined bit in the respective packet is the same as the predetermined condition such th the respective packet associated with one of said processing elements is transferred to another of said processing elements in response to said instruction with an address signal in accordance with an arbitrary graph.

11. The array processing system a set forth in claim 10, wherein said single instruction multiple address means further includes a priority circuit for prioritizing transferring of respective packets when the condition of the preselected bit in more than one respective packet is the same as the predetermined condition.

12. The array processing system s set froth in claim 11, wherein said single instruction multiple address means generates an exist signal to one of said processing elements when the respective packet associated with said one processing element is to be transferred from said one processing element.

* * * * *